United States Patent [19]

Howell

[11] Patent Number: 4,640,151

[45] Date of Patent: Feb. 3, 1987

[54] BICYCLE PEDALLING APPARATUS

[76] Inventor: Richard J. Howell, 20 W. Canal St., #502, Winooski, Vt. 05404

[21] Appl. No.: 583,890

[22] Filed: Feb. 27, 1984

[51] Int. Cl.[4] .............................................. G05G 1/14
[52] U.S. Cl. ..................................... 74/594.6; 36/131
[58] Field of Search ................... 74/594.4, 594.6, 560; 36/122, 131, 62; 280/11.3, 613

[56] References Cited

U.S. PATENT DOCUMENTS

| | | |
|---|---|---|
| 293,581 | 2/1884 | Kressly . |
| 550,409 | 11/1895 | Hanson ............................... 74/594.6 |
| 589,988 | 9/1897 | Young . |
| 598,325 | 2/1898 | McIntyre ............................ 74/594.6 |
| 3,727,932 | 4/1973 | Druss et al. ......................... 280/613 |
| 3,869,136 | 3/1975 | Jackson .............................. 280/613 |
| 3,918,732 | 11/1975 | Wulf ............................. 280/613 X |
| 3,964,343 | 6/1976 | Lauterbach ........................ 74/594.6 |
| 4,021,056 | 5/1977 | Oakes ................................. 280/613 |
| 4,089,236 | 5/1978 | Genzling ............................ 74/594.4 |
| 4,188,737 | 2/1980 | Haver ................................. 36/131 |
| 4,196,920 | 4/1980 | Salomon ............................ 280/613 |
| 4,377,952 | 3/1983 | Gamondes ........................ 74/594.6 |
| 4,418,937 | 12/1983 | Salomon ............................ 280/613 |
| 4,449,308 | 5/1984 | Schar ................................... 36/131 |
| 4,488,453 | 12/1984 | Drugeon et al. .................. 74/594.6 |

FOREIGN PATENT DOCUMENTS

| | | | |
|---|---|---|---|
| 15803 | 9/1980 | European Pat. Off. .......... | 74/594.6 |
| 0058438 | 8/1982 | European Pat. Off. . | |
| 57240 | 8/1982 | European Pat. Off. ............. | 74/560 |
| 3149345 | 12/1981 | Fed. Rep. of Germany . | |
| 1056 | 5/1980 | PCT Int'l Appl. ................ | 74/594.6 |
| 1396393 | 6/1975 | United Kingdom . | |
| 1586136 | 3/1981 | United Kingdom . | |

Primary Examiner—Gary L. Smith
Assistant Examiner—Rodney M. Lindsey
Attorney, Agent, or Firm—Lahive & Cockfield

[57] ABSTRACT

Cycle pedalling apparatus has a latch element that projects upward on a pedal and that has a pair of latch members directed and resiliently deflectable along a latch axis that extends longitudinal with the axis about which the pedal revolves. A socket element on the sole of a rider's foot releasably and replaceably couplingly seats the latch element for pedalling action, and releases from the latch element under multiple selected non-pedalling loads.

15 Claims, 17 Drawing Figures

BICYCLE PEDALLING APPARATUS

BACKGROUND OF THE INVENTION

This invention relates to pedalling apparatus for a bicycle, an exercise cycle and like pedalled mechanisms. More particularly, the invention provides a pedalling system that fastens a cyclist's shoe to a pedal securely for all pedal strokes. The pedalling system releases the shoe from the pedal readily upon an untoward, non-pedalling movement. Further, a cyclist can intentionally couple the shoe to the pedal, and release from the pedal, easily and essentially instantaneously. The invention is described, for sake of clarity, with reference to bicycle pedalling equipment, and is applicable to other pedal-driven mechanisms.

The common bicycle pedal is driven only on a downstroke by the down thrust of a cyclist's foot. The addition of toe straps and like harnesses on a pedal, to engage the cyclist's shoe, enables an upward thrust also to propel the cycle. The addition of cleats allows the cyclist to provide ankling action, in which a combination of upward and rearward forces further enhances pedalling efficiency. The inconvenience and accident hazard of toe straps and cleats have lead to other devices for fastening a cyclist's shoe to a pedal, as German Patent Specification No. DE 3,149,345 illustrates. There is still need, however, for pedalling apparatus which is safe, convenient, reliable and simple.

Accordingly, it is an object of this invention to provide a pedal-shoe fastening apparatus that engages readily, that maintains positive retention for all pedalling strokes, and that releases readily in response to non-pedalling foot movements and loads, both intentional and accidental.

Another object is to provide cycle pedalling apparatus of the above character which is convenient, reliable, and safe to use. It is a further object that the apparatus be capable of providing high performance cycling. The attainment of this objective calls on the apparatus to function with greater energy transfer, and correspondingly less energy dissipation, than occurs with a conventional toe strap and cleat.

Other objects of the invention will in part be obvious and will in part appear hereinafter.

SUMMARY OF THE INVENTION

The forces and movements of a foot which are involved in pedalling can have up to six degrees of action. A vertical downward force of a rider's foot on a pedal is perhaps the most common action. A rider using the prior toe straps in addition can apply a vertical upward force. Toe straps also transfer a longitudinal forward force to the pedal, and the prior cleat transfers a longitudinal backward force. A third possible action is a lateral or sideways force, which contributes little to pedalling. The remaining three actions are rotational movements which a rider's foot can undergo. Twist is rotation about a vertical axis and roll is rotation about a longitudinal axis. Bend is rotation about a lateral axis, which is the axis that extends parallel to the axis about which a pedal revolves.

Pedalling desirably involves vertical and longitudinal forces, typically with a different magnitude for each direction, i.e. up, down, forward, and backward. The rider's foot in addition may bend during a full pedalling stroke, and may twist and/or roll slightly.

A pedalling mechanism accordingly is to accommodate certain levels of vertical and longitudinal forces, and of bend, twist, and roll. The mechanism, however, is to release the rider's foot under excessive levels of such forces and movements, other than vertically down and longitudinally forward. The release action is to respond to different levels of the different pedalling actions. For example, it desirably withstands the vertically upward force useful in pedalling, and withstands the pedalling level of longitudinally backward force, but releases when either force exceeds these levels. Similarly, rotational movements in excess of those desired for pedalling or safe for the rider are to cause release. A pedalling mechanism according to the invention can meet these potentially conflicting requirements for secure coupling and reliable release, at different levels for different actions.

More particularly, the present invention features improvements in pedalling apparatus for releasably and replacably coupling a rider's foot to a bicycle crank that carries at least one pedal, revolvable about a normally-horizontal pedal axis. The improvements include a latch element upwardly projecting from the pedal and a socket element adapted for wearing on a rider's foot. The latch element has a pair of aligned latch members. At least one latch member is resiliently biased relative to the other one, along a latch axis oriented longitudinal with the pedal axis. The two latch members preferably are directed approximately along the latch axis, and both are resiliently biased. The socket element has a latch-receiving recess with first and second latch seats for releasably and replacably couplingly seating the latch members. The resilient latching bias resists release of the latch element from the socket element. In use, the coupled latch and socket elements transmit a cycling thrust to the pedal in response to downstroke forces exerted by the rider, and in response to upstroke and backstroke forces, which together are termed ankling forces. Further, the apparatus provides a breakaway action, in which the latch element unseats from the socket element in response to accidental, trauma-producing forces and moments, and in response to other selected, non-pedalling rider movements.

In a preferred embodiment, the socket recess descends into the sole of a cycling shoe and has a seat portion for coupling receiving the latch element. The recess also has a front guiding portion extending forwardly of the seat portion for guiding the latch element into and out of the seat portion.

The front guiding portion has a downwardly facing and longitudinally extending ramp. The ramp provides the recess with progressive depth within the socket element as the ramp extends backwardly toward the seat portion. The socket recess also has inwardly-facing flairing sidewalls extending outwardly and forwardly along the front guiding portion for providing the recess with increasing longitudinal width forward of the seat portion.

The latch element has a forward thrust structure upwardly projecting therefrom along the latch axis with the latch members. The socket recess has a back wall portion rearward of the seat portion and extending downwardly. This wall portion abuts the forward thrust structure of the latch element seated in the socket element.

In one preferred embodiment, the latch members are lateral spring-compressed plungers; in another, the members are resilient rods. A further optional feature is that each latch seat has an inner detent arranged to seat an outwardly biased latch member, and has an outer detent that is off-center from the inner detent. The outer detent is arranged to seat a latch member with a lesser resilient bias than an inner detent.

Other preferred features of the invention include a resiliency-adjusting mechanism for adjusting the resilient bias of the latch members, and a pivotal attachment mechanism for adjustably attaching the latch element to the pedal with a selective orientation of the latch axis relative to the pedal axis. The latch-axis orientation can be adjusted with two degrees of freedom, to match a rider's foot.

As will be apparent from the description below, pedalling apparatus having a latch element and a socket element according to this invention provides efficient coupling, which reduces energy dissipation. The apparatus is simple and inexpensive to manufacture; is safe, efficient and easy to use; and is non-obtrusive and non-interfering during walking, and during pedalling activities when its use is not desired.

Pedalling apparatus according to the invention thus features a latch element that releasably and replaceably couples with a socket element. The latch action is with resilient bias and is along a latch axis that is directed longitudinally with the axis about which the pedal revolves. The latch action remains coupled under a forward foot thrust and under a downward foot thrust, relative to the pedal. The latch action releases under selected non-pedalling levels of other forces, including torques or moments, whether along other directions or rotational about axes other than the pedal axis. The force of the resilient bias can readily be adjustable, and the orientation of the latch axis, longitudinal to the pedal axis, can readily be adjustable with at least one or two degrees of freedom. The release of the latch action, with uncoupling of the latch element from the socket element, is automatic and essentially instantaneous, as with a snap action. Further, the latch and socket elements can immediately be re-coupled, without any resetting or other preparation.

Other features, objects and advantages of this invention will become more apparent to one skilled in the art from the appended claims and the following detailed description taken with the drawings.

DRAWINGS

FIG. 6A shows response to longitudinal forces,
FIG. 6B shows response to twist forces,
FIG. 6C shows response to roll forces,
and
FIG. 6D shows response to vertical forces;

DESCRIPTION OF THE ILLUSTRATED EMBODIMENTS

Figure 1:
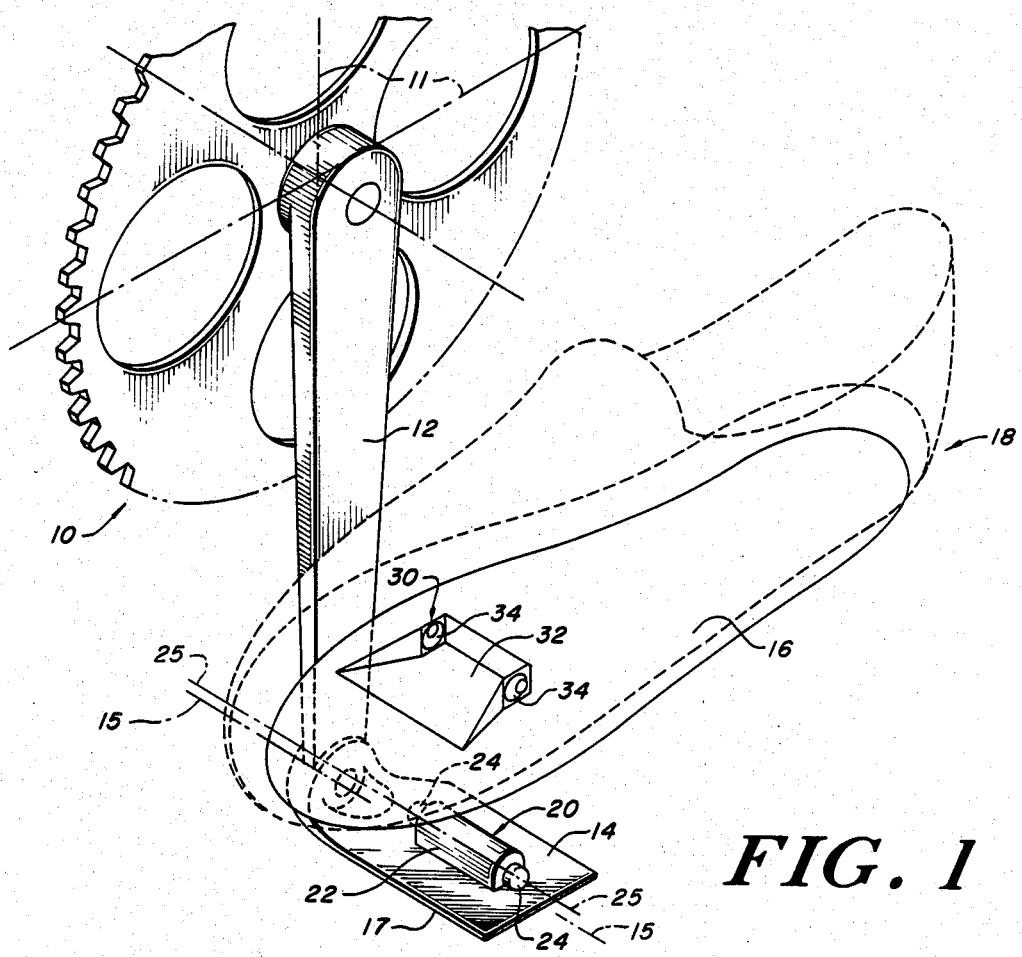
FIG. 1 is perspective view of pedalling apparatus embodying the invention, shown in an uncoupled condition.

As shown in FIG. 1, a bicycle, a portion of which is generally designated 10, has a crank 12 that carries at least one pedal 14. The crank 12 is shown coplanar with a normally-vertical plane 11. The pedal is mounted to revolve about a normally-horizontal pedal axis 15 in response to stroke forces exerted by a rider of the bicycle.

Pedal 14 is generally flat on one side, having a planar surface 17, and has a latch element 20 projecting outwardly from the other side 19. The pedal typically is weighted to revolve normally to an orientation in which planar surface 17 faces downwardly and latch element 20 faces upwardly. (The opposite bias can also be used, as well as a balanced weighting.) The upwardly facing latch element meets a socket element 30 worn on the bicycle rider's foot. The socket element is arranged to engage the latch element 20 for releasably and replaceably coupling the rider's foot to the pedal 14. When the elements are thus engaged, the sole 16 of the rider's shoe abuts the pedestal surface 19 adjacent the latch element.

Figure 2:
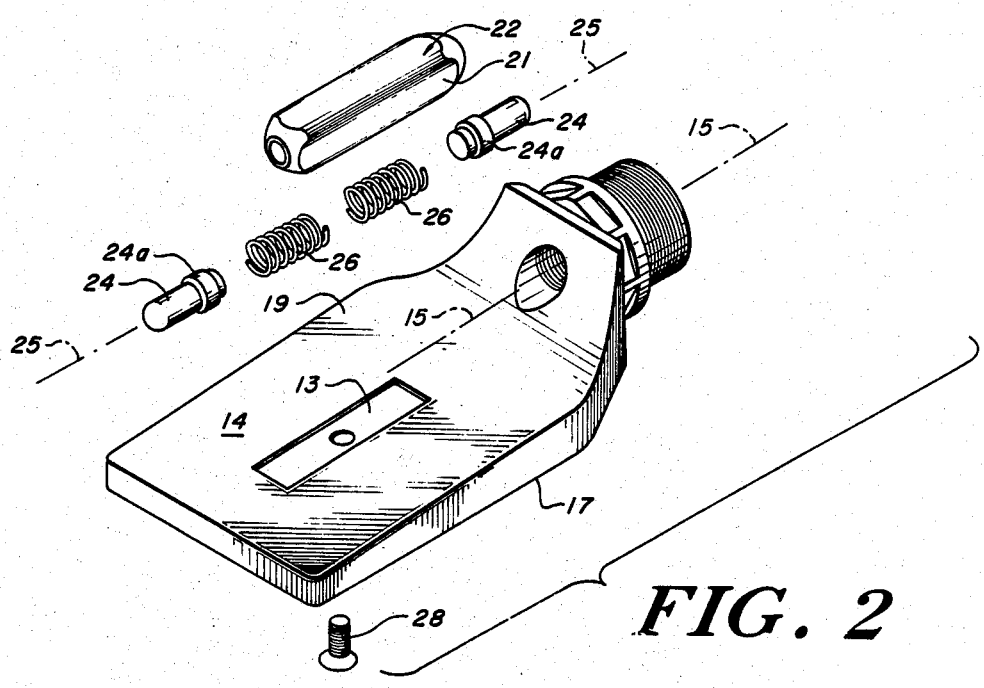
FIG. 2 is an exploded perspective view of the latch element of the pedalling apparatus shown in FIG. 1.
Figure 3:
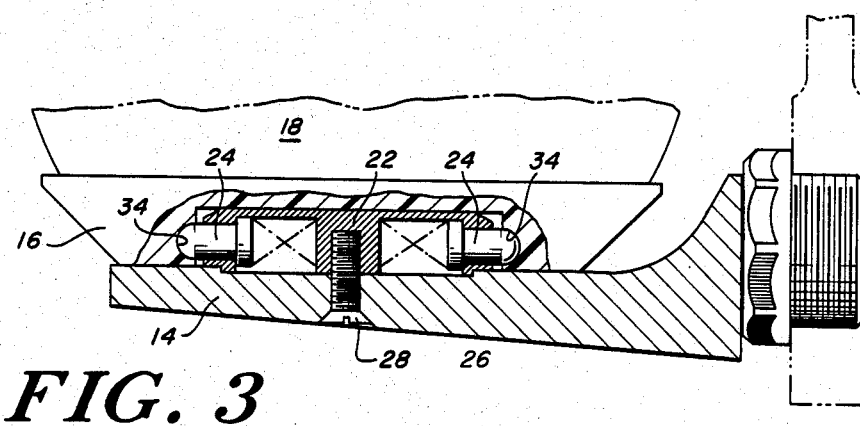
FIG. 3 is a cross-sectional side view of the pedalling apparatus of FIG. 1, shown in coupled condition.

The illustrated latch element 20, as shown in FIGS. 2 and 3, mountingly seats in a recess 13 in pedal surface 19 and is fastened to the pedal 14 by screw 28, which is recessed into planar surface 17. The latch element 20 has an upwardly projecting block 22, elongated along a latch axis 25. The latch block has a flat back wall that projects upwardly from the pedal, transversely to the pedal surface 19. This wall forms a forward thrust surface 21 for transfering forward thrust from the rider to the pedal. Block 22 has internal cavities that mountingly seat first and second plunger-like latch members 24, 24. The latch members are oppositely directed and aligned along the latch axis 25, and project outward, along the latch axis, from both ends of the latch block. The axis 25 is longitudinal with the pedal axis 15 and, in the embodiment of FIGS. 1-3, is parallel with the pedal axis. The cavities within latch block 22 also seat compression springs 26, 26 that resiliently bias each latch member outward, away from one another, along the latch axis 25. An annular shoulder 24a on each latch member limits its outward projection from the latch block.

Figure 4:
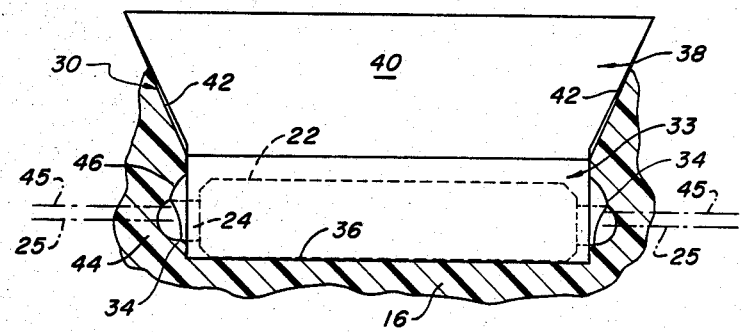
FIG. 4 is a plan view of a preferred socket element in the sole of the bicycling shoe of FIG. 1 showing the latch element in phantom.
Figure 5A:
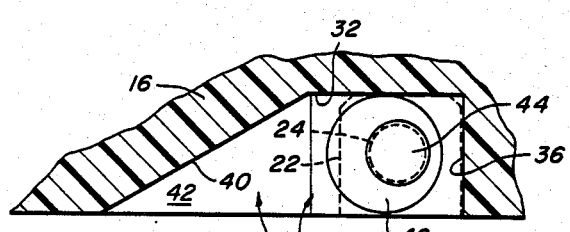
FIGS. 5A and 5B are transverse sectional views of the socket element of FIG. 4 showing the two stages of seating of a latch element, in accordance with a preferred feature of the invention.
Figure 5B:
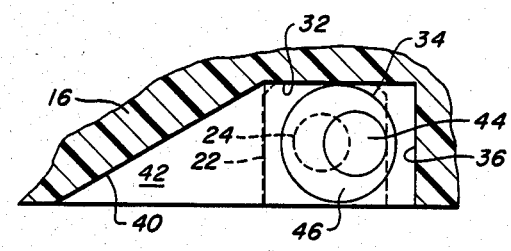

The illustrated socket element 30, shown in FIGS. 4 and 5A and 5B, is disposed within and forms part of the sole 16 of a bicycling shoe 18 (FIG. 1). The socket element 30 has a latch-receiving recess 32 having opposed first and second latch seats 34, 34. The latch seats are arranged for releasably and replaceably couplingly seating the opposed latch members 24 against the action of the resilient bias of the latch springs 26.

FIGS. 4 and 5A and 5B show that each illustrated latch seat 34 is preferably structured to provide a two-stage latching action. For this purpose, each latch seat 34 has an inner major detent 46 offset from the latch axis 25. The two opposed inner detents 46-46, aligned along a recess axis 45, seat the latch members 24-24 with slight resiliently-elastic lateral freedom, as FIG. 5B shows. Each detent 46 is further recessed with a minor detent 44 centered on the latch axis 25. The aligned opposed minor detents 44-44 seat, with a snug fit, the latch members 24-24, as FIG. 5A shows. Each minor detent 44 is non concentric with the major detent 46 which it recesses, but is rearwardly offset, i.e. to the right in FIGS. 5A and 5B. Correspondingly, the latch axis 25 is offset rearwardly from the recess axis 45. This double-acting latch seat structure allows coupling tolerance in pedalling loads. One particular example is that the minor detents provide efficient (low loss) energy transfer between the shoe and the pedal. The two stage structure is considered to be an optional feature of this invention deemed preferable for high performance cycling operation.

With further reference to FIGS. 3 through 5, the socket recess 32 has a seat portion 33 that mountingly receives the latch element 20, and a guiding portion 38 that guides the latch element into and out of the seat portion. The recess seat portion 33 is configured to matingly receive the latch element block 22. It accordingly has a flat back wall 36 forming the back side of the recess 32. This wall abuts against the back wall of the block 22, i.e., against the thrusting surface 21 of the latch element, when the latch element is fully seated in the socket recess, as in FIG. 5A, to transfer a rider's forward foot thrust to the cycling pedal 14. This thrust transfer is independent of the resilient latch and release mechanism. The latch-seating detents 46, 46 recess outwardly the sidewalls of the seat portion 33. The upper wall of the seat portion abuttingly engages the top of the latching element block 22 when the latch element is fully seated in the socket recess.

The recess guide portion 38 communicates with and extends forwardly from the seat portion 33, as FIGS. 4 and 5A and 5B show. The upper surface 40 of the guide portion is a downwardly-facing ramp which extends forward from the front of the seat portion with decreasing depth in the recess. The sidewalls 42,42 of the guide portion flare outwardly apart from the recess seat portion to form funneling-like further ramps for guiding the latch element into the seat portion. The flared sidewalls thus provide the guiding portion of the recess with progressively decreasing longitudinal width with increasing distance into the recess toward the seat portion.

As noted, the socket element 30 preferably is an integral part of the sole of a bicycling shoe. A cyclist wearing such a shoe may walk comfortably, and ride a bicycle having other pedals, because the socket element 30 is disposed fully within the sole 16 (FIG. 1). It does not extend beyond the surface of the sole and therefore does not interfere with normal walking and other activities.

After mounting a bicycle 10 that is equipped with a latch element 20 on each pedal, the rider decides whether to couple the socket elements with the latch elements. When a cyclist choses to ride without this foot-to-pedal coupling, each pedal is flipped about the pedal axis 15 so that the planar surface 17 faces upwardly toward the sole 16. The socket element 30 does not interfere with pedalling on this surface. Further, the latch element 20 is arranged on pedal 14 so that when the element 20 is facing away from the socket element 30 and the bicycle 10 is angulated during extreme cornering, the pedal 14 will scrape the ground before the element 20 scrapes.

Figure 6A:
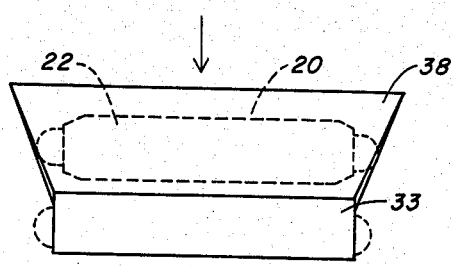
FIGS. 6A–6D are simplified showings of different coupling/release actions of the latch and socket elements of FIG. 1, i.e.
Figure 6B:
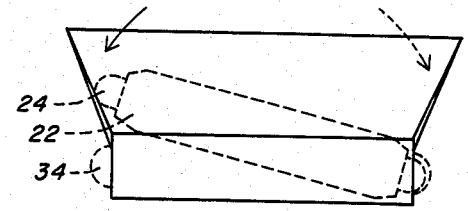
Figure 6C:
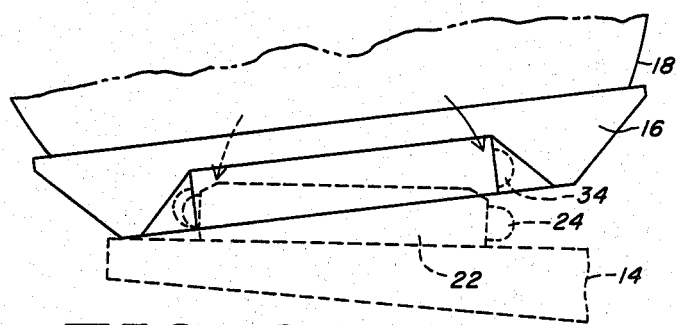
Figure 6D:
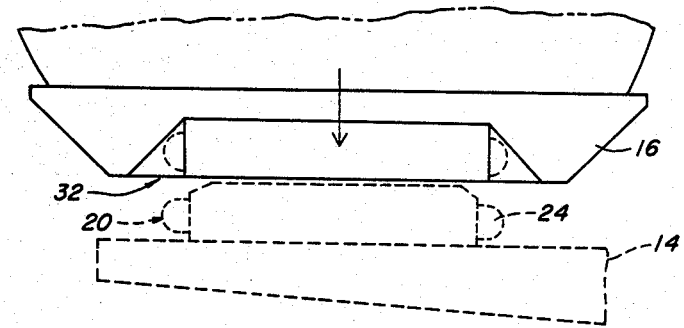
Figure 7:
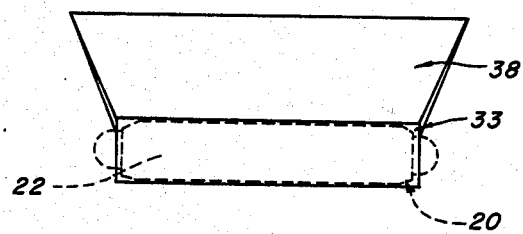
FIG. 7 is a simplified view like FIG. 6A showing the latch element fully seated in the socket element.

When the rider chooses to couple to the pedals, the normally weighted pedals in the preferred embodiment dispose each latch element 20 upward to face the shoe sole 16. The cyclist accordingly simply steps down on the pedal 14, and the geometry of the recess 32 on the rotatable pedal translates the stepping down force into a combination of forces that guide the latch block 22 into the socket recess 32. FIGS. 6A-6D show the seating of the latch block in the socket recess under different conditions, and FIG. 7 shows the fully-seated condition. In particular, FIG. 6A shows the latching operation when the latch element moves longitudinally into the socket element. The top of the latching element block 22 provides an upwardly-facing follower surface that engages and moves along the downwardly-facing ramp surface 40 of the socket element 30 for this operation. FIG. 6B shows that a rider can latch the elements together with a twisiting movement of the foot, and FIG. 6C shows the latching action with a roll movement of the foot. FIG. 6D shows latching with the socket element moving vertically onto the latch element.

As the latch block 22 enters the seat portion 33 (FIGS. 6A, 6B, 6C), the projecting latch members 24 seat in latch seats 34. When the latch and socket elements are fully coupled (FIG. 7), the resilient bias of the latch members retains the block 22 within the recess 32. The normal outward resilient bias causes the members 24 to seat within the outer, minor detents 44 (FIG. 5A).

The minor detents 44, disposed within recess 32 more rearwardly than the major detents 46, preferably seat the latch members with snug fit throughout the application of a typical pedalling load. When the latch and socket elements are thus coupled, the socket back wall 36 abuts against the forward thrust surface 21 of block 22, and aids in transfering forward thrust from a rider's foot to the pedals. When a larger load forces the latch members to retract a small amount and unseats the latch block from the minor detents, the increased resilient bias maintains the latch members seated in the inner, major detents 46 (FIG. 5B). In this manner, the latch block 22 remains held within seat portion 33 against the pedalling-level forces of vertical and longitudinal loads and of different rotational stresses.

The latch and socket elements 20, 30 automatically release and separate under load levels greater than those employed in pedalling and yet lower than those likely to cause any injury or other trauma to the rider. The release levels thus are well below the biomechanical failure thresholds of the foot-ankle-lower leg system along and about the vertical, longitudinal and lateral axes. In addition, a bicyclist can voluntarily, i.e. intentionally, decouple the show 18 from the pedal 14 by twisting the foot about the twist axis of FIG. 1, rolling the foot about the roll axis, or by pushing the foot backward, along the roll axis, with respect to the pedal 14. An upward pull, and combinations of these movements, can also effect intentional release. The release actions under different conditions are opposite to the latch operations which FIGS. 6A–6D show. After any release, however, the latch element 20 and the socket element 30 are immediately ready for recoupling.

Note that the foregoing combination of cycling latch and socket element is driven to completely block separation and remain coupled by the downward and forward thrusts that are typical in cycle pedalling. Pure lateral thrusts also do not cause release.

Figure 8:
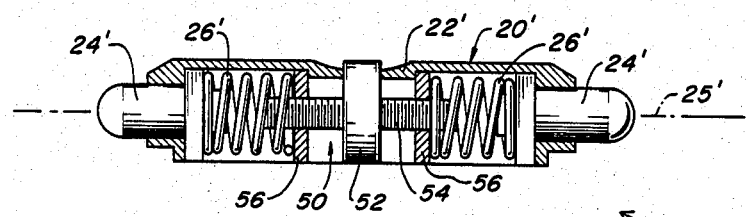
FIG. 8 is a cross-sectional view of another latch element according to the invention and having a resiliency adjusting mechanism.
Figure 9:
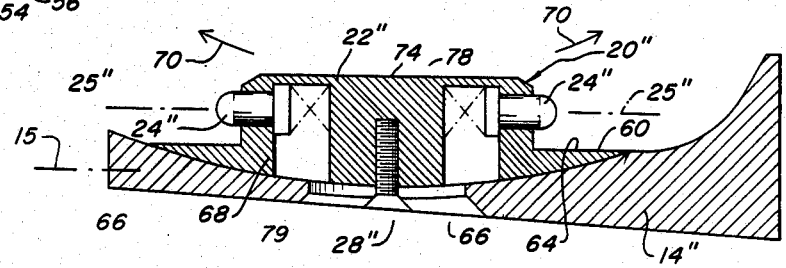
FIG. 9 is a cross-sectional view of another latch element mounted on a pedal according to a further embodiment that has an adjustable mounting mechanism.
Figure 10:
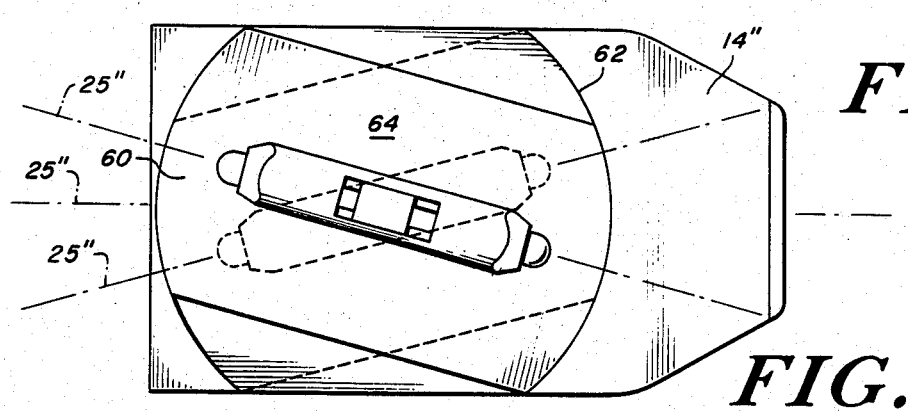
FIG. 10 is a top plan view of the pedal shown in FIG. 9, showing the latch element, in bold and in phantom, oriented along different latch axes.

The structure and operation of other embodiments of latch element 20, shown in FIGS. 8–11, closely parallel the embodiment shown in FIGS. 1–7. Therefore, many details in the above description are not repeated below, and corresponding elements in FIGS. 8–10 are designated with the same reference manual, followed by a superscript prime or double prime.

FIG. 8 shows a latch element 20' that has a tensioning structure 50 for adjusting the resilient spring bias acting on the latch members 24', 24'. Specifically, the latch block 22' mounts a rotatable threaded stem 54 that carries an externally accessible knob 52. Turning the knob rotates the stem to move threaded nonrotating plates 56, 56 toward and away from each other along latch axis 25'. This movement adjustably changes the compression of the springs 26', each of which is compressed between a plate 56 and a latch member 24'.

FIGS. 9 and 10 show a latch element 20" that mounts to a pedal 14" with two degrees of adjustment of the latch axis 25" relative to the pedal axis 15". The adjustably-mounted latch element 20" has a latch block 22" secured on a mounting disk 60 that mounts to the pedal 14". The latch 22" carries resiliently-biased latch members 24", 24" that protrude outwardly from the block along a latch axis 25", in much the same manner as in FIGS. 2 through 5.

The illustrated mounting disk 60 has a truncated circular periphery 62, and a flat upper surface 64 to which the latch block 22" is secured, preferably centered on a diameter of the circular periphery. The disk 60 and latch block 22" thus move as a unitary one-piece unit. The lower surface 66 of the mounting disk 60 is spherically rounded. The pedal 14" has a mating spherically rounded mounting seat 68 recessing the pedal surface 19".

Figure 9A:
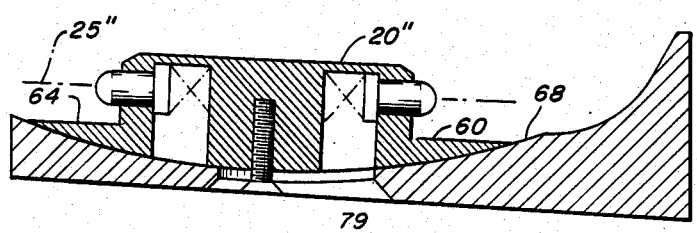
FIG. 9A is a view like FIG. 9 showing the latch element with an adjustable cant.
Figure 9B:
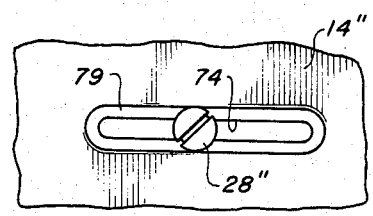
FIG. 9B is a detail bottom plan view of the embodiment of FIG. 9.

The block-carrying disk 60 thus matingly seats in the pedal seat 68. The disk is normally seated with the upper surface 64 in a normally-horizontal plane, as appears in FIG. 9, so that the latch axis 25" is parallel with the pedal axis 15" in the plane of FIG. 10. However, to accommodate a different rider's foot posture, the disk can be rolled, as indicated with arrows 70, 70 in FIG. 9. This roll adjustment, shown in detail in FIGS. 9A and 9B, provides a selected cant to the latch element 20" and correspondingly to the disk surface 64 against which the rider's shoe sole presses.

With further reference to FIGS. 9 and 10, the latch element 20' can also be rotated in the plane of FIG. 10, i.e. about the twist axis, to offset the latch axis 25" relative to the pedal axis 15" in the normally-horizontal plane of FIG. 10. This adjustment accommodates certain foot postures. The mating spherical disk surface 66 and the pedal seat 68 preferably are provided with abrasive finishes to enhance secure positioning of the latch element 20" relative to the pedal 14" with the foregoing selected orientation.

The adjustably-mounted latch element 20" is secured in any of these positions by means of a mounting screw 28" that seats in the pedal 14" and threadably engages the latch block 22". The screw 28" passes through a slot 74 through the pedal 14 and elongated parallel to the axis 15", i.e. along the lateral diameter of the spherical seat 68. The slot 74 has an arcuate recess 78 of increased width extending along the surface 17" that provides a recessed surface for the head of the screw 28". The inner, arcuate surface 79 of the recess of 78 is curved to correspond with the curvature of the disk surface 66 and of the seat 68, in the plane of FIG. 9. The disk 60 thus carries the mounting screw 28, and the screw slides along the slot 74, as in a guide, as the disk is canted to a desired orientation, as in FIG. 9A, relative to the pedal 14". Tightening the screw 28" within the latch block 22" and against the arcuate surface 79 clamps the disk 60 to the pedal 14" in the selected cant position.

Figure 11:
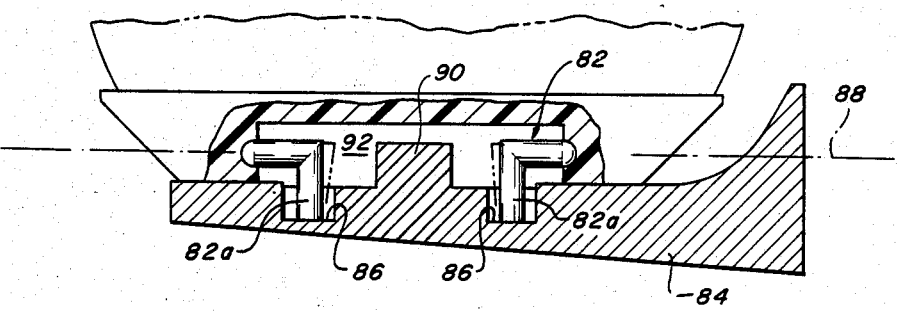
FIG. 11 is a cross-sectional view of a further embodiment of pedalling apparatus according to the invention and in which the latch members include resilient rods; the phantom showing illustrates the resilient flex of the rods.

FIG. 11 shows that the invention can also be practiced with a resiliently deformable one-piece latch element 82 that has a pair of latch rods 82a, 82a secured to a pedal 84, in lieu of the spring-biased latch members 24 and latch block 22 of FIGS. 2 through 5 and other embodiments of FIGS. 8–11. Each illustrated latch rod 82a is curved through one 90° quadrant, as with an L-shape. A base end of the rod is fixed to the pedestal, suitably within a recess 86 in order to accommodate additional length of the rod 82a. The other, plunger end of the rod 82a projects outwardly, along a latch axis 88, in a manner similar to the previously-described embodiments. Also fixed to the pedal 84, within the space between the latch rods 82a, 82a along the latch axis 88, is an upwardly-projecting forward thrust block 90. The block is arranged to abut against the back wall 92 of the socket element with which the latch element 82 seats. Each latch rod 82a has sufficient resilience to couple with and release from a socket element such as the socket element 30 described above, and the forward thrust block 90 aids in transferring forward thrust from a rider's foot to the pedal. The action of the resilient latch rods 82a, 82a of FIG. 11, in coupling with a latching socket element and in releasing from such a socket element, may be similar to that described above with regard to the constructions of FIGS. 1 through 7.

Among modifications which can be made in practicing the invention is the provision of a socket element separate from a rider's shoe. For example, a latching socket element as described above, can be provided as a device separate from a shoe and which a rider can fasten to the underside of a shoe, suitably by way of straps or flexible clips. Further, the socket element can be part of a two-piece molded sole that has a flexible sole material, to enhance walking comfort, and a more dense socket material, to enhance force transfer and durability against stresses of the latch members. One alternative to the FIG. 2 construction is a one-piece pedal and latch block. A further alternative construction employs a disk, like disk 60 in FIG. 9, but which has a flat bottom and thereby provides adjustable-orientation of the latch element about the vertical twist axis, as in FIG. 10.

It will thus be seen that the objects set forth above, among those made apparent from the preceding description, are efficiently attained. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Pedalling apparatus for releasably and replaceably coupling a rider's foot to a pedal arranged to revolve about a pedal axis, said pedalling apparatus having the improvement comprising
   A. latch means upwardly projecting on said pedal with first and second latch members selectively directed along a latch axis longitudinal with said pedal axis, said latch axis and a transverse longitudinal axis being in a normally horizontal plane and said upward projection being normally vertical and orthogonal to that horizontal plane,
   B. at least one of said latch members being resiliently biased relative to the other along said latch axis, and
   C. socket means arranged for wearing on a rider's foot and having a walking surface free of pedal-engaging projections and having a latch-receiving recess with first and second latch seats for releasably and replaceably couplingly seating, against the action of said resilient bias, said latch members, said socket means being adapted to couple with said latch means upon vertical downward movement, upon longitudinal forward movement, and upon rotational twist movement of said socket means relative to said latch means,
   D. whereby said socket means resists unseating of said latch means coupled therewith and transmits to said latch means a cycling thrust in response to pedalling loads, and said latch means unseats from said socket means in response to selected non-pedalling loads.

2. Bicycle pedalling apparatus according to claim 1, comprising the further improvement wherein said socket recess has
   A. a latch-seating portion which includes said first and second latch seats and is arranged for receiving said latch means, and
   B. a front guiding portion extending forwardly of said seat portion for guiding said latch means into and out of said seat portion.

3. Bicycle pedalling apparatus according to claim 2, comprising the further improvement wherein said socket recess further has a downwardly projecting back wall portion rearward of said seating portion for abutment against said latch means seated in said socket means.

4. Bicycle pedalling apparatus according to claim 2 having the further improvement wherein
   A. said latch means has upwardly-facing follower means, and
   B. said front guiding portion has downwardly-facing camming means extending longitudinally along said front guiding portion and providing said recess with progressive depth from the front thereof to said seating portion.

5. Bicycle pedalling apparatus according to claim 2, comprising the further improvement wherein said front guiding portion has inwardly-facing flaring sidewall means extending outwardly and forwardly along said recess with increasing width forwardly of said seating portion.

6. Bicycle pedalling apparatus according to claim 1, having the further improvement wherein said first and second latch members comprise, respectfully, first and second spring-tensioned plungers.

7. Bicycle pedalling apparatus according to claim 1, having the further improvement wherein said latch members comprise first and second projections aligned and resiliently-deflectable along said latch axis.

8. Bicycle pedalling apparatus according to claim 1, having the further improvement wherein said latch means includes resiliency-adjusting means for adjusting said resilient bias.

9. Bicycle pedalling apparatus according to claim 1, having the further improvement comprising mounting means for adjustably mounting said latch means to said pedal with selective positioning of said latch axis relative to said pedal axis.

10. Bicycle pedalling apparatus according to claim 9, having the further improvement wherein said adjustable mounting means includes means providing two degrees of said adjustable mounting of said latch means.

11. Bicycle pedalling apparatus according to claim 1, having the further improvement wherein said socket means includes a shoe having a sole forming said latch-receiving recess therein.

12. Bicycle pedalling apparatus according to claim 1, having the further improvement wherein at least one of said latch seats comprises
   A. first detent means arranged to seat one of said latch members with a first resilient bias, and
   B. second detent means communicating with said first detent for seating said one latch member with a second, greater resilient bias.

13. Bicycle pedalling apparatus according to claim 12, having the further improvement wherein
   A. said first detent means is disposed along said latch axis, and
   B. wherein said second detent mean is disposed along a detent axis parallel to and offset from said latch axis.

14. Bicycle pedalling apparatus according to claim 1 having the further improvement wherein at least one said latch seat has means for providing first and second latching engagements of a said latch member, with different resilient bias.

15. Bicycle pedalling apparatus according to claim 1 having the further improvement comprising mounting means for mounting said latch means to said pedal with selective rotational adjustment about two different axes.

* * * * *